March 15, 1966 A. VIOLLEAU 3,239,930
METHOD OF PRODUCING HOLLOW TUBULAR BODIES
Original Filed April 30, 1962 2 Sheets-Sheet 1
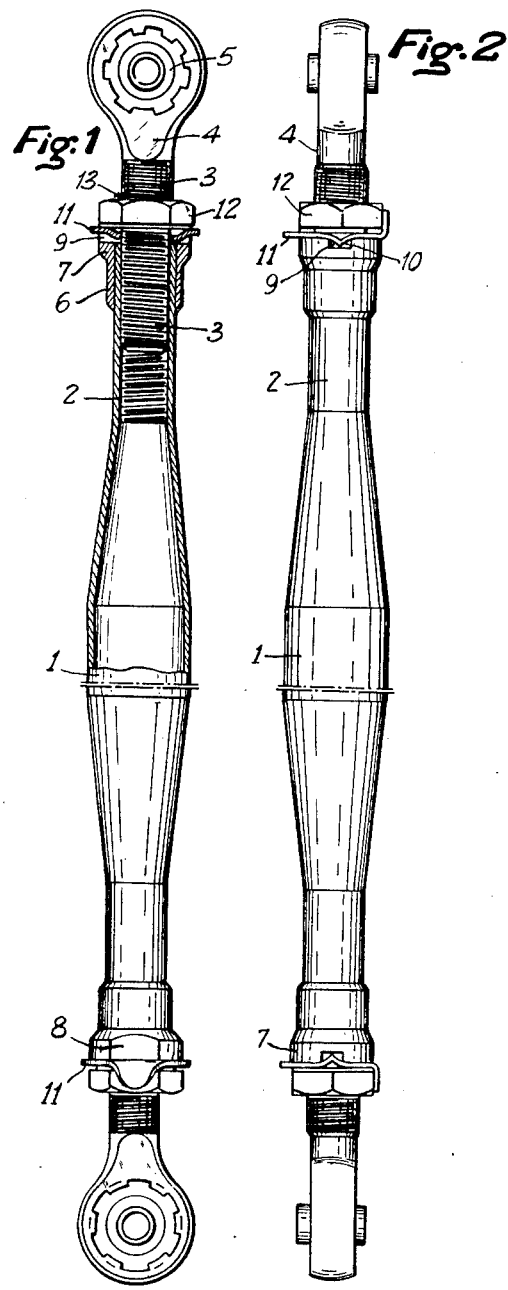
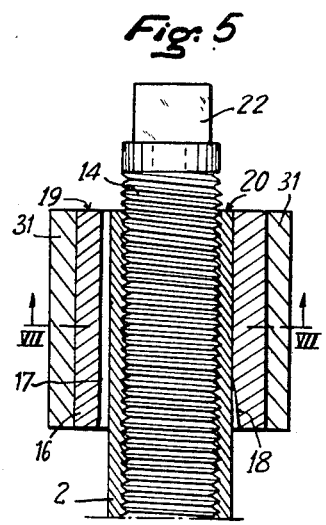
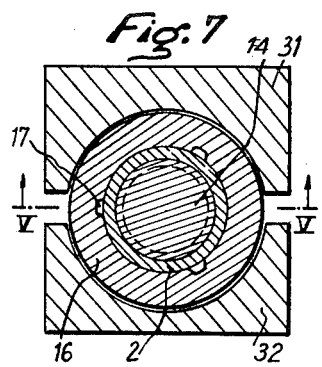
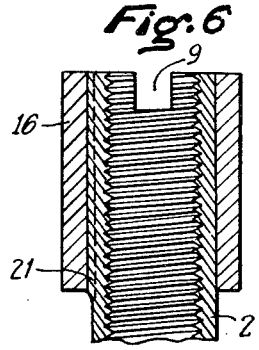
INVENTOR
ANDRE VIOLLEAU
By Young + Thompson
ATTYS.

United States Patent Office 3,239,930
Patented Mar. 15, 1966

3,239,930
METHOD OF PRODUCING HOLLOW
TUBULAR BODIES
André Violleau, Vitrolles-le-Roucas, France, assignor to
Société Anonyme de Recherches de Mécanique Appliquée, Saint-Vallier-sur-Rhône, Drôme, France, a company of France
Continuation of application Ser. No. 191,150, Apr. 30, 1962. This application May 10, 1965, Ser. No. 454,561
Claims priority, application France, Dec. 31, 1957, 754,942, Patent 1,189,383
5 Claims. (Cl. 29—516)

This application is a continuation of application Serial No. 191,150, filed April 30, 1962, now abandoned, and which is a continuation-in-part of application Serial No. 781,319, filed December 18, 1958, now abandoned.

The present invention relates to elongated hollow bodies such as connecting rods or links for rigid control systems and transmissions.

An object of this invention is to provide an improved connecting rod or link adapted for greater safety and more reliable performance in rigid control systems and transmissions. Hereinafter, the term "connecting rods" refers to hollow bodies including ties, struts, links and similar means for securing together the ends of tubular structures. The present invention also includes the method for producing such articles.

Among the various types of flight control systems used on board aircraft, there may be mentioned those rigid control systems in which the movements of the joy-stick produced by the pilot are transmitted to the aircraft control surfaces by connecting rods pivotally secured at their ends to levers or transmission members. The conditions under which such control systems operate require a high degree of safety in resisting the extreme forces to which they must be subjected.

It is advantageous to construct these connecting rods in such a manner that they will be as light as possible in conjunction with a larger safety factor, along with a simpler construction, as is the case throughout aeronautical technique. To this end, builders have reduced the number of intermediate transmissions, elements or supports employed, and have increased the lengths of the connecting rods in such rigid control systems. Consequently, the compressional and other stresses transmitted by these connecting rods have required the tubes forming such connecting rods to be of increased diameters. Those connecting rods formed by tubes of a constant diameter terminate with generally adjustable end pieces having pivotal connecting means incorporating, for instance, a ball bearing. Such adjustable end pieces, being provided with a tapped section rigid with the cooperating larger diameter tube, are consequently very heavy.

It has also been proposed to reduce the weight of such connecting rods by reducing the diameter of the tubes at their ends through shrinking. However, the tapped sections of such ends, which are secured by bolts or rivets, still involve a substantial weight as before, and lead to a complex assembly.

A last simplification which has been proposed consists in omitting the tapped sections of the end pieces, in which case the shrunken ends of the tubes are tapped directly; but such machining involves the serious drawback of weakening the ends of the tubes, firstly through removal of material from the shrunken ends, and furthermore through the cutting across the inner longitudinal fibers of the tube which takes place.

With a view to overcoming these drawbacks, the connecting rod according to this invention, intended for use in rigid control systems or for transmission purposes in general, comprises a metal tube having shrunken end portions formed with internal threads. These threads are obtained by a deformation of the inner longitudinal metal fibers or gain lines of the tube material. There is no cutting of these fibers, such as occurs with conventional tapping operations. Reinforcing rings having either two flat sections or notches are mounted over the end portions of the tube and positioned flush with the tube ends. The reduction of the outer diameter of the ends of the tube allows suitably threaded straps or end pieces to engage directly with the corresponding internal threads inside the end portions. The end pieces are held in position by nuts contacting both the tube ends and the ends of the reinforcing rings, with the aid of braking or locking washers which enter transverse grooves provided across the ends of the tubes and of the rings.

The simplification of the mounting of such a connecting rod permits its use even in the case of a tube of small diameter allowing only a limited shrinking at the ends. Furthermore, with this mounting arrangement, a connecting rod may be equipped at each end with an adjustable end piece, the pitches of the meshing threads at the two ends being either equal or different and being directed either both in the same direction or opposite to each other, as desired. The mounting also permits an adjustment in situ where required, without any stressing of the straps or end pieces which have threaded tail pieces engaging the internally threaded ends of the tube.

The present invention also embraces the method of producing connecting rods constructed in the above-disclosed manner. According to this method, the end portions of the metal tube are subjected to an annealing action, the annealed ends are shrunken with forging and pressure into frusto-conical form having tube walls of progressively increasing thickness, the extreme end portions are then reduced by a rotary compressing action to substantially cylindrical form over a threaded mandrel, thereby obtaining an internal threading of the tube ends along the direction of the metal fibers, and a broached reinforcing sleeve is secured with a further rotary compressing action to each reduced end portion of the tube. This brief summary is, of course, not a complete description of the invention, which includes in its scope the features recited in the appended claims.

Various other objects, features and advantages will appear from the following complete description of one embodiment of the invention, while the novel features thereof will be particularly pointed out hereinafter in the appended claims.

In the drawings:

FIGURE 1 is a partial sectional front elevational view of a connecting rod according to this invention.

FIGURE 2 is a side elevational view of the connecting rod illustrated in FIG. 1.

Figure 3:
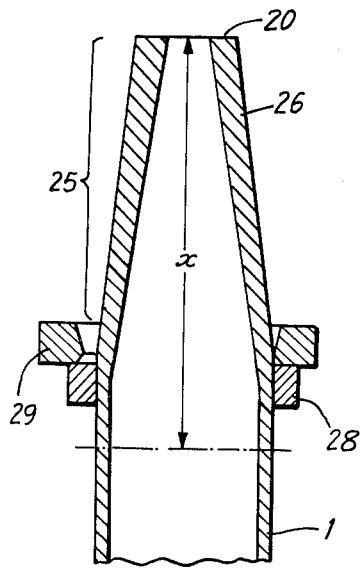
Figure 4:
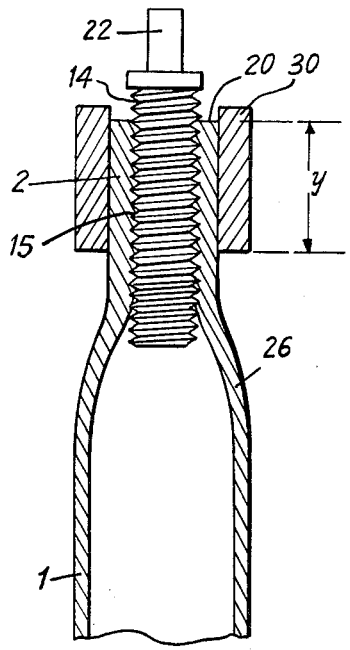

FIGURES 3, 4, 5 and 6 illustrate, on a larger scale, four stages of producing the improved connecting rod, these stages corresponding, respectively, to the shrinking of the tube end into a frusto-conical section, the formation of the cylindrical extreme end portion over an inserted mandrel with suitable threads, the engagement of the reinforcing ring with the cylindrical portion, and lastly, the fitting of this reinforcing ring and the machining of the groove for retaining the braking or locking washer.

FIGURE 7 is a cross-sectional view taken along the line VII—VII of FIG. 5.

In the illustrated embodiment of the invention, the connecting rod shown in FIGS. 1 and 2 includes a body 1 comprising a metal tube, the ends 2 of which are shrunk by any desired mechanical means. One suitable way of obtaining shrunken, tapped and reinforced end portions according to the invention will be described later in conjunction with FIGS. 3–7.

The reduced diameter thus obtained at the ends 2 of connecting rod 1 is obtained in a manner such that the connecting rod may be provided with an inner thread adapted to be engaged directly by the threaded tail piece 3 of a connecting member or end piece 4. A ball bearing assembly 5 is carried inside the end piece 4.

Over the end of each shrunk cylindrical portion 2 there is fitted a reinforcing ring 6 including a collar 7 engaging the corresponding end of tube 1. Ring 6 is provided with parallel, flat, lateral surfaces 8 by means of which the ring 6 may be gripped by a wrench for holding or rotating. A transverse groove or slot 9 is formed across collar 7 and tube end 2 so as to be engaged by catches or stamped sections 10 of a braking or locking washer 11. The washer is thus adapted to hold a nut 12 mounted on threaded tail piece 3 in a position locking the latter in place.

The tail piece 3 of connecting member 4 carries a reference mark, such as a tell-tale groove 13, for instance. The position of groove 13 is adjusted in such a manner that the length of tail piece 3 provides, in association with the length of reinforcing ring 6, a proper relative positioning of the different parts together with a sufficient minimum length of engagement inside the tapping. If, during adjustment, the tell-tale groove 13 were to appear outside nut 12, this would show that the selected lengths no longer provide the proper relative positioning. It is then necessary to employ another end piece 4 having a longer threaded tail piece 3 or, better still, to resort to a longer tube 1.

Preferably, the position of nut 12 along tail piece 3 is adjusted for a length of engagement of the threads which is calculated by taking into account the expected stresses to be applied. Then the nut 12 is held frictionally or otherwise in its adjusted position by the braking or locking washer 11.

The connecting rod illustrated by FIGS. 1 and 2 is produced in the following manner. An elongated tube 1 is formed having elongated grain structure or fibers of the metal. An end portion of the tube of length $x$, as seen in FIG. 3, is then shrunk into a conical or frusto-conical shape, in such a manner that the end portion 25 of tube 1 will have walls 26 which increase in thickness as end 20 is approached. This compression of the tube end 25 also progressively reduces the outer diameter of the tube, as is clearly shown in FIG. 3. The reduction or shrinking of end 25 into a cone or conical frustum is achieved by a forging or swaging method. One typical mechanism for applying rotary forging or swaging to tube 1 is shown diagrammatically in FIG. 3. The metal tube 1 is retained by a tube support or bearing 28 in a manner to permit both rotation and axial displacement of tube 1 by conventional feeding means (not shown). The tube passes by a pressure die 29, which is carried in a movable head serving to displace the die transversely of the longitudinal axis of tube 1. Die 29 thus imparts the correct forging and pressure to tube 1 to obtain the frusto-conical cross section 25 of FIG. 3.

A tool or mandrel 14 provided with threads of the desired type is next inserted at end 20 into the conical frustum 25 of FIG. 3. The end portion 25 containing mandrel 14 is subjected to a rotary compression in any convenient manner, as indicated by pressure die 30 in FIG. 4. This rotary compressing action is not applied to the entire conical section 25, but is limited to the extreme end portion of length $y$ in FIG. 4. The compression of length $y$ of cone 25 over threaded tool 14 reduces the extreme end portion to a substantially cylindrical end 2 with an internal threading corresponding to that of mandrel 14.

The rotary swaging and compression of extreme end 2 by pressure die 30 deforms the metal of the inner surface of wall 26 to conform to the threading on tool 14 while simultaneously thickening the wall of end 2 with respect to the original wall thickness. As a result, the longitudinal metal fibers in wall 26 remain intact and continuous through the inner threads rather than being severed as in normal tapping or machining. The successive formation of cone 25 and reduction of the extreme end against mandrel 14 to form cylinder 2 avoid any abrupt reduction of the diameter of the finished connecting rod, which if present would give rise to stresses likely to cause failure under high loads. There is a gradual modification of the wall thickness between end 2 and tube 1, as illustrated by wall 26 in FIG. 4 of the drawing, giving a connecting rod of maximum strength. In addition, the depth of the internal thread at the inner end of reduced cylinder 2 decreases gradually, which contributes to greater reliability in a similar manner.

The reinforcing ring 6 is subsequently formed and affixed around the cylindrical end section 2. The ring blank comprises a cylindrical member or sleeve 16, shown in FIG. 5, with a central bore having three shallow, longitudinal grooves 17 (FIG. 7) with smooth edges. This bore opens at one of its ends with an inner frusto-cone 18 having a reduced slope. The ring blank or sleeve 16 is placed around the end 2 of tube 1, the latter still being engaged with mandrel 14. Ring blank 16 is inserted over end 2 through the frusto-cone 18 until the other end 19 of the sleeve is substantially flush with the outer end 20 of the tube. Before removing mandrel 14, suitable rotating pressure dies 31, 32 (FIGS. 5 and 7) apply a rotary compressing action to ring blank 16. As a result, the metal of the external wall of end section 2 is deformed and flows under cold working by dies 31, 32 into grooves 17, as shown at 21 in FIG. 6. This entry of part of the material of tube 1 into grooves 17 of ring blank 16 insures a secure holding of the latter against relative rotation under a predetermined stress, as a consequence of the shape provided, the shrunk end 2 of the tube not being subjected to any strain during the fitting of ring 16. The modification of the shape of the cross section is obtained in a gradual manner.

The threaded tool 14 is then removed with a screw driver 22. Finally, the ring blank 16 is machined to form the transversse groove 9 (FIG. 6) across both the ring and the tube end 20, the collar 7 and the two flat surfaces 8. The desired construction of reinforcing ring 6 is thus obtained.

It will be understood that various modifications in the details, materials, steps of the method and the arrangement of parts, which have been herein described and illustrated in order to explain the nature of the invention, may be made by those skilled in the art within the principle and scope of the invention as defined by the accompanying claims. Obviously, any equivalent mechanical device for forging, working, and applying pressure to the cone 25 could replace die 29, without departing from the scope and spirit of the invention. Similarly, other mechanical means might be used in place of rotary compression dies 30, 31 and 32. The connecting member 4, also, may be equipped with a smooth rotula, or replaced by a strap or by a member having a quite different purpose, such as a bearing plate, for example.

Having described my invention, I claim:

1. A method of producing a hollow tubular body such as a connecting rod, comprising introducing an externally screw-threaded mandrel having threads of uniform diameter into one end portion of a metal tube, subjecting said end portion to radially inward compression from the associated end of the tube toward the other end of the tube a distance less than the distance of extension of the threads of the mandrel into the tube thereby to produce internal screw threads on the tube having a depth that diminishes in a direction toward said other end of the tube, and thereafter unscrewing the mandrel from threaded engagement with the reduced end portion of the tube.

2. A method as claimed in claim 1, which is performed on both ends of the tube.

3. A method of producing a hollow tubular body such as a connecting rod, comprising subjecting at least one end of a metal tube to forging pressure to produce on the tube a tapered end portion of progressively reduced diameter, introducing an externally screw-threaded mandrel having threads of uniform diameter into said reduced end portion of the tube, subjecting the end portion to radially inward compression from said one end of the tube toward the other end of the tube a distance less than the distance of extension of the threads of the mandrel into the tube thereby to produce internal screw threads on the tube having a depth that diminishes in a direction toward said other end of the tube, and thereafter unscrewing the mandrel from threaded engagement with the reduced end portion of the tube.

4. A method of producing a hollow tubular body such as a connecting rod, comprising subjecting at least one end of a metal tube containing a screw-threaded mandrel to radially inward compression to plastically deform and to reduce the end of the tube to substantially cylindrical form while simultaneously producing internal threading thereon, placing a reinforcing sleeve over the internally threaded reduced end portion, subjecting said sleeve to radially inward compression to reinforce said end of the tubular body, and thereafter unscrewing the mandrel from threaded engagement with the reduced end portion of the tube.

5. A method as claimed in claim 4, in which the first-named radially inward compression is applied from said end of the tube toward the other end of the tube a distance less than the distance of extension of the threads of the mandrel into the tube, thereby to produce on the interior of the tube screw threads that diminish in depth toward said other end of the tube.

References Cited by the Examiner
UNITED STATES PATENTS

| | | | |
|---|---|---|---|
| 236,723 | 1/1881 | Sellers | 10—86 XR |
| 1,502,133 | 7/1924 | Anderson | 29—175 |
| 2,130,699 | 9/1938 | Reinartz | 72—377 |
| 2,441,580 | 5/1948 | Mageoch. | |
| 2,488,566 | 11/1949 | Sperry. | |

WHITMORE A. WILTZ, *Primary Examiner.*